United States Patent
Seminara (10) Patent No.: US 10,160,282 B2
(45) Date of Patent: Dec. 25, 2018

(54) HYDRO-MECHANICAL SUSPENSION FOR VEHICLE

(71) Applicant: SISTEMI SOSPENSIONI S.p.A., Corbetta (IT)

(72) Inventor: Massimo Seminara, Asti (IT)

(73) Assignee: SISTEMI SOSPENSIONI S.p.A., Corbetta (IT)

( * ) Notice: Subject to any disclaimer, the term of this patent is extended or adjusted under 35 U.S.C. 154(b) by 0 days.

(21) Appl. No.: 15/552,861

(22) PCT Filed: Feb. 26, 2016

(86) PCT No.: PCT/EP2016/054125
§ 371 (c)(1),
(2) Date: Aug. 23, 2017

(87) PCT Pub. No.: WO2016/135309
PCT Pub. Date: Sep. 1, 2016

(65) Prior Publication Data
US 2018/0037083 A1 Feb. 8, 2018

(30) Foreign Application Priority Data

Oct. 26, 2015 (IT) .................. 102015000006968

(51) Int. Cl.
*B60G 17/04* (2006.01)
*B60G 17/027* (2006.01)
(Continued)

(52) U.S. Cl.
CPC ..... *B60G 17/0408* (2013.01); *B60G 17/0272* (2013.01); *B60G 17/056* (2013.01);
(Continued)

(58) Field of Classification Search
CPC ............. B60G 17/08; B60G 17/0272; B60G 2202/414; B60G 2500/30;
(Continued)

(56) References Cited

U.S. PATENT DOCUMENTS 4,700,971 A * 10/1987 Doi ..................... B60G 17/018
280/5.515
4,898,257 A   2/1990 Brandstadter
(Continued)

FOREIGN PATENT DOCUMENTS

DE    4026790 C1   10/1991
DE    10227417 A1   2/2004
(Continued)

OTHER PUBLICATIONS

International Search Report and Written Opinion of the International Searching Authority for PCT International Application No. PCT/EP2016/054125 dated May 13, 2016 (11 pages).

*Primary Examiner* — Darlene P Condra
(74) *Attorney, Agent, or Firm* — Howard & Howard Attorneys PLLC (57) ABSTRACT

The suspension comprises a mechanical spring interposed between an unsprung mass (UM) and a sprung mass (SM) of the vehicle, a shock-absorber interposed between the unsprung mass (UM) and the sprung mass (SM), in parallel with the mechanical spring, a hydraulic linear actuator, an accumulator, a tank (T) containing an incompressible working fluid and a hydraulic circuit for hydraulically connecting, the hydraulic linear actuator, the accumulator and the tank (T) with each other. A single reversible pump (P) is arranged along the third hydraulic line. A reversible electric motor (M) drives the pump (P) in either direction, and a plurality of valves ($V_1$, $V_2$, $V_3$, $V_4$, $V_5$, $V_S$) control the flow (Continued)

of the working fluid between the accumulator, the tank (T) and the hydraulic linear actuator.

6 Claims, 4 Drawing Sheets

(51) Int. Cl.
*B60G 17/056* (2006.01)
*B60G 17/08* (2006.01)

(52) U.S. Cl.
CPC ........ *B60G 17/08* (2013.01); *B60G 2202/154* (2013.01); *B60G 2202/413* (2013.01); *B60G 2202/414* (2013.01); *B60G 2202/416* (2013.01); *B60G 2500/20* (2013.01); *B60G 2500/203* (2013.01); *B60G 2500/30* (2013.01); *B60G 2500/302* (2013.01)

(58) Field of Classification Search
CPC .......... B60G 2500/302; B60G 2500/20; B60G 2202/416; B60G 2202/413; B60G 2202/154; B60G 2500/203
See application file for complete search history.

(56) References Cited

U.S. PATENT DOCUMENTS

| | | | | |
|---|---|---|---|---|
| 5,097,419 A | * | 3/1992 | Lizell | B60G 17/016 188/266.5 |
| 5,102,161 A | * | 4/1992 | Williams | B60G 17/0152 137/625.62 |
| 5,231,583 A | * | 7/1993 | Lizell | B60G 17/015 280/5.506 |
| 5,390,948 A | * | 2/1995 | Kuriki | B60G 17/0182 280/5.508 |
| 5,785,344 A | * | 7/1998 | Vandewal | B60G 17/0152 267/64.16 |
| 6,312,065 B1 | | 11/2001 | Freitag et al. | |
| 2005/0187059 A1 | * | 8/2005 | Kroppe | B60G 17/0162 475/116 |

FOREIGN PATENT DOCUMENTS

| | | |
|---|---|---|
| EP | 0398804 A1 | 11/1990 |
| JP | 2007030665 A | 2/2007 |
| WO | 2013107812 A1 | 7/2013 |

* cited by examiner

HYDRO-MECHANICAL SUSPENSION FOR VEHICLE

CROSS-REFERENCE TO RELATED APPLICATIONS

The present application is a National Stage of International Patent Application No. PCT/EP2016/054125, filed on Feb. 26, 2016, which claims priority to and all the benefits of Italian Patent Application No. 102015000006968, filed on Feb. 26, 2015, both of which are hereby expressly incorporated herein by reference in their entirety.

BACKGROUND OF THE INVENTION

1. Field of the Invention

The present invention relates to a hydro-mechanical suspension for vehicle which enables to adjust, at each wheel of the vehicle or at each axle of the vehicle, the stiffness of the suspension and the height of the vehicle from the ground.

2. Description of the Related Art

When designing a conventional vehicle suspension, in which each vehicle wheel is connected to the vehicle body by a shock-absorber and a spring, the designer is always required to find the best compromise between two conflicting requirements, namely handling and comfort. More specifically, the two parameters that have to be taken into account, for each wheel, in order to find the best compromise are the damping of the shock-absorber and the stiffness of the spring. Depending on the typical use of the vehicle, the suspension is designed so as to give more importance to the handling requirement (in case for example of sport cars) or to the comfort requirement (in case for example of sedans).

In order to allow the vehicle to adapt to different operating conditions, for example to have better handling during cornering or better ability to absorb bumps when running on uneven roads, it is known to use active suspensions which allow to change the damping of the shock-absorber, and hence to change the force-speed characteristic curve thereof, and/or to change the stiffness of the spring, so as to vary the force exchanged between the sprung mass and the unsprung mass of the vehicle. More specifically, the stiffness of the spring can be changed not only in dynamic conditions of the vehicle, but also in stationary conditions, for example to adapt the vehicle attitude to load changes.

In this connection, hydro-mechanical suspension architectures are known, which comprise a hydraulic linear actuator arranged in series or in parallel with the mechanical spring and an accumulator hydraulically connected to the actuator.

Figure 1:
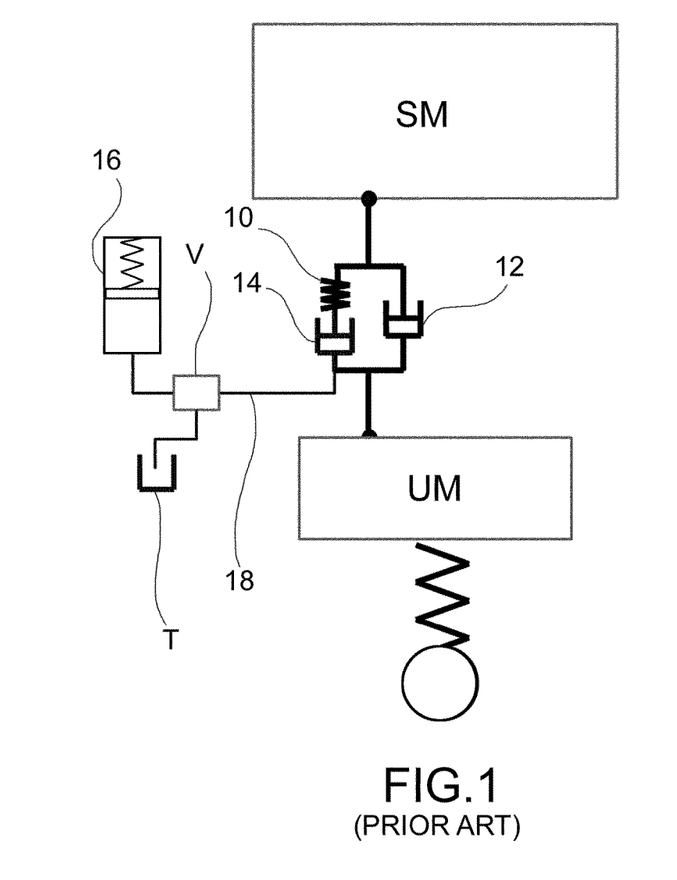
FIG. 1 schematically shows a known hydro-mechanical suspension architecture comprising a hydraulic linear actuator which is arranged in series with the mechanical spring and is hydraulically connected to an accumulator.

FIG. 1 of the appended drawings schematically shows an example of hydro-mechanical suspension architecture where the unsprung mass of the vehicle (indicated UM) is connected to the sprung mass of the vehicle (indicated SM) by a mechanical spring 10 and a shock-absorber 12, and a hydraulic linear actuator 14 is arranged in series with the mechanical spring 10 and is hydraulically connected to an accumulator 16 through a hydraulic line 18. A valve V is arranged along the hydraulic line 18 to allow the hydraulic line 18 to be put into communication with a tank T. An architecture of this kind will be referred to hereinafter as "in-series architecture".

Figure 2:
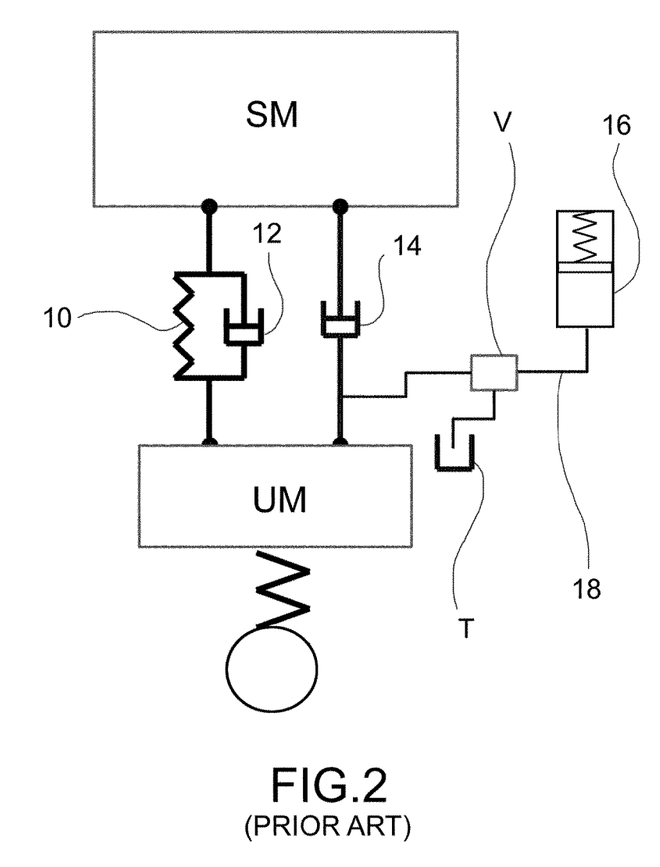
FIG. 2 schematically shows a known hydro-mechanical suspension architecture comprising a hydraulic linear actuator which is arranged in parallel with the mechanical spring and is hydraulically connected to an accumulator.

FIG. 2 of the appended drawings, where parts and elements identical or corresponding to those of FIG. 1 are indicated by the same reference signs, schematically shows another example of a hydro-mechanical suspension architecture, where the unsprung mass UM of the vehicle is connected to the sprung mass SM of the vehicle by a mechanical spring 10 and a shock-absorber 12, and a hydraulic linear actuator 14 is arranged in parallel with the mechanical spring 10 and is hydraulically connected to an accumulator 16 through a hydraulic line 18. Also in this case, a valve V is arranged along the hydraulic line 18 to allow the hydraulic line 18 to be put into communication with a tank T.

According to these known architectures, the actuator 14 works therefore as a hydraulic spring acting in series or in parallel with the mechanical spring 10. By suitably changing the hydraulic path between the actuator 14 and the accumulator 16, that is to say, by suitably changing the pressure level (or the oil volume) inside the accumulator 16, it is possible to change the stiffness of each actuator 14, thereby changing the overall stiffness of the suspension (i.e. the stiffness of the assembly formed by the mechanical spring 10 and by the actuator 14). With a suspension of this kind, irrespective of whether it has an in-series architecture or an in-parallel architecture, an active suspension system is obtained which allows to actively control, by adjusting the stiffness of the suspension of each wheel, the vehicle body modes resulting from the driving manoeuvres.

A further example of a hydro-mechanical suspension for vehicle is known from JP 2007-030665. According to this known example, the suspension comprises a mechanical spring and a shock-absorber that are interposed between the unsprung mass and the sprung mass of the vehicle, in parallel with each other, a hydraulic linear actuator arranged in series with the mechanical spring, an accumulator, a tank containing an incompressible working fluid and a hydraulic circuit for hydraulically connecting with each other, according to predetermined operating modes, the actuator, the accumulator and the tank, wherein the hydraulic circuit comprises a first hydraulic line through which the actuator is hydraulically connected to the accumulator, a first pump which is made as a reversible pump and is arranged along the first hydraulic line, a second hydraulic line through which the actuator is hydraulically connected to the tank, said second hydraulic line intersecting the first hydraulic line in a point comprised between the actuator and the first pump, a second pump which is made as a unidirectional pump and is arranged along the second hydraulic line, an electric motor arranged to drive simultaneously the first and second pumps, a first bypass line connected to the first hydraulic line upstream and downstream of the first pump, a second bypass line connected to the second hydraulic line upstream and downstream of the second pump, and a bypass valve selectively shiftable between a first position, in which it allows the working fluid to flow through the first bypass line to bypass the first pump, but prevents the working fluid from flowing through the second bypass line, and a second position, in which it prevents the working fluid from flowing through the first bypass line, but allows the working fluid to flow through the second bypass line to bypass the second pump.

Such a known hydro-mechanical suspension has several drawbacks. First of all, the first pump is always connected, through the first hydraulic line, both to the actuator and to the accumulator. Since there are always leakages through any reversible pump, these leakages inevitably lead to a change in the position of the actuator, in particular to a reduction in the height of the vehicle from the ground with respect to the value that has been initially set. Secondly, having two pumps simultaneously driven by the electric motor reduces the efficiency of the system. When the second pump is driven to charge the accumulator with the fluid taken from the tank, the first pump is also (uselessly) driven, which results in an additional unnecessary energy consumption.

SUMMARY OF THE INVENTION

It is an object of the present invention to provide an improved hydro-mechanical suspension for vehicle with respect to the above-discussed prior art, in particular to provide a hydro-mechanical suspension for vehicle which allows to adjust the vehicle attitude in a continuous or multistable manner, to keep the position and/or the stiffness of the actuator unchanged for a long time with no energy consumption, to change the actuation speed, to recover, during the attitude adjustment phase, the energy introduced into the system and to adjust the overall stiffness in a continuous or multistable manner.

This and other objects are fully achieved according to the invention by virtue of a hydro-mechanical suspension comprising, for each vehicle wheel, a hydraulic linear actuator arranged in series with the mechanical spring and an accumulator arranged to be hydraulically connected to the actuator through a hydraulic circuit, wherein the hydraulic circuit comprises a first hydraulic line, or upstream line, through which the accumulator is hydraulically connected to a tank, a second hydraulic line, or downstream line, through which the hydraulic linear actuator is hydraulically connected to the tank, a third hydraulic line, or connection line, which connects the first and second hydraulic lines to each other, one single pump which is made as a reversible pump and is arranged along the third hydraulic line to pump an incompressible working fluid (oil) from the first hydraulic line to the second one or vice versa, a reversible electric motor coupled to the pump, and a plurality of valves arranged along the first and second hydraulic lines to control the flow of the working fluid between the accumulator, the tank and the actuator, wherein said plurality of valves comprise a first valve and a second valve arranged along the first hydraulic line, as well as a third valve and a fourth valve arranged along the second hydraulic line.

By virtue of such a configuration, the suspension according to the invention allows to adjust the position and/or the stiffness of the actuator with the following operating modes charging of the hydraulic circuit by pumping of the working fluid from the tank to the accumulator with the first valve and the fourth valve in the closed position and with the second valve and the third valve in the open position, lifting of the vehicle body with infinite stiffness by pumping of the working fluid from the accumulator to the hydraulic linear actuator with the first valve and the third valve in the closed position and with the second valve and the fourth valve in the open position, or, when for example the amount of working fluid in the accumulator is not sufficient to ensure the required lifting travel of the actuator, by pumping of the working fluid from the tank to the hydraulic linear actuator with the second valve and the third valve in the closed position and with the first valve and the fourth valve in the open position, and lowering of the vehicle body with infinite stiffness by pumping of the working fluid from the actuator to the accumulator with the first valve and the third valve in the closed position and with the second valve and the fourth valve in the open position, or, if for example the pressure in the accumulator reaches a limit value, by pumping of the working fluid from the tank to the hydraulic linear actuator with the second valve and the third valve in the closed position and with the first valve and the fourth valve in the open position.

According to an embodiment, the hydraulic circuit further comprises a fourth hydraulic line, or bypass line, which connects the first and second hydraulic lines with each other, in parallel with the third hydraulic line. In this case, said plurality of valves further comprises a fifth valve, or bypass valve, arranged along the fourth hydraulic line to control the direct flow of the working fluid between the accumulator and the hydraulic linear actuator. This embodiment allows the suspension to operate also according to the following operating modes "bang-bang" adjustment of the stiffness, wherein starting from a normal operating condition with the actuator directly connected to the accumulator through the bypass valve, the overall stiffness of the suspension is increased by closing the bypass valve, whereby the stiffness of the actuator becomes infinite and therefore the overall stiffness of the suspension becomes equal to the stiffness of the mechanical spring, and adaptive adjustment of the stiffness, wherein the stiffness of the suspension is adjusted by controlling the flow of the working fluid between the tank and the hydraulic linear actuator by suitably piloting the pump, the first valve and the fourth valve.

Preferably, the bypass valve is made as a proportional valve which is able to discharge the excess working fluid to the tank to allow to adjust the pressure in the second hydraulic line, and hence to continuously control the force applied by the hydraulic linear actuator, or to allow to continuously control the position of the hydraulic linear actuator.

According to another embodiment, the hydraulic circuit further comprises a relief valve arranged to connect the accumulator directly with the tank to empty the hydraulic circuit.

BRIEF DESCRIPTION OF THE DRAWINGS

Further characteristics and advantages of the present invention will become more apparent from the following detailed description, given purely by way of non-limiting example with reference to the appended drawings, where.

DETAILED DESCRIPTION OF THE INVENTION

Figure 3:
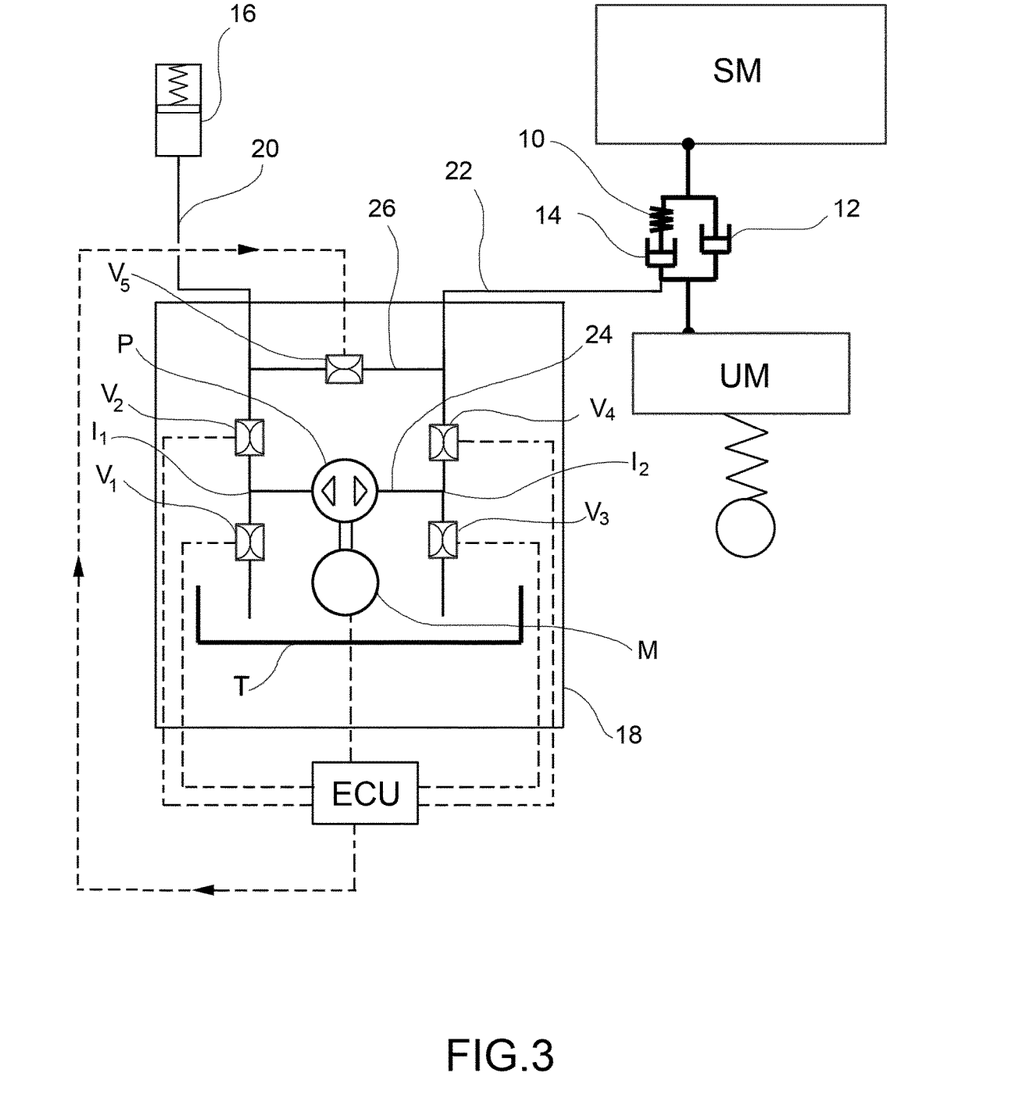
FIG. 3 schematically shows a hydro-mechanical suspension according to an embodiment of the present invention.

With reference first to FIG. 3, where parts and elements identical or corresponding to those of FIGS. 1 and 2 (prior art) have been given the same reference signs, a hydro-mechanical suspension for vehicle basically comprises a mechanical spring 10 interposed between an unsprung mass and a sprung mass of the vehicle, indicated UM and SM, respectively, a shock-absorber 12 interposed between the unsprung mass UM and the sprung mass SM, in parallel with the mechanical spring 10, a hydraulic linear actuator 14 arranged in series with the mechanical spring 10, an accumulator 16, a tank T containing an incompressible working fluid (oil) and a hydraulic circuit, generally indicated 18, for hydraulically connecting the actuator 14, the accumulator 16 and the tank T with each other according to predetermined operating modes. Indicating the stiffness of the mechanical spring 10 with $k_1$ and the stiffness of the actuator 14 with $k_2$, the overall stiffness k of the suspension is thus equal to the equivalent stiffness of a system of two springs of stiffnesses $k_1$ and $k_2$, respectively, arranged in series, according to the following equation:

$$k=1(1/k_1+1/k_2).$$

The hydraulic circuit 18 comprises a first hydraulic line 20, or upstream line, through which the accumulator 16 is hydraulically connected with the tank T, a second hydraulic line 22, or downstream line, through which the actuator 14 is hydraulically connected with the tank T, and a third hydraulic line 24, or connection line, which connects the first and second hydraulic lines 20 and 22 with each other.

The hydraulic circuit 18 further comprises one single pump P which is made as a reversible pump and is arranged along the third hydraulic line 24 to pump the working fluid from the first hydraulic line 20 to the second hydraulic line 22 or vice versa. The pump P is made for example as a gear pump. A reversible synchronous electric motor M, made for example as a brushless DC electric motor with speed-, phase- and current-control, is coupled to the pump P to drive it in either direction.

The hydraulic circuit 18 further comprises a plurality of (electrically- or hydraulically-operated) valves $V_1$, $V_2$, $V_3$ and $V_4$ arranged along the first and second hydraulic lines 20 and 22 to control the flow of the working fluid between the accumulator 16, the tank T and the actuator 14. More specifically, a first valve $V_1$ and a second valve $V_2$ are arranged along the first hydraulic line 20, on the same side as the tank T and on the same side as the accumulator 16, respectively, relative to the point of intersection (indicated $I_1$) between the first hydraulic line 20 and the third hydraulic line 24, while a third valve $V_3$ and a fourth valve $V_4$ are arranged along the second hydraulic line 22, on the same side as the tank T and on the same side as the actuator 14, respectively, relative to the point of intersection (indicated 12) between the second hydraulic line 22 and the third hydraulic line 24. Preferably, the hydraulic circuit 18 further comprises a fourth hydraulic line 26, or bypass line, connecting the first and second hydraulic lines 20 and 22 with each other, in parallel with the third hydraulic line 24. A fifth valve $V_5$, or bypass valve, is arranged along the fourth hydraulic line 26 to control the direct flow of the working fluid between the accumulator 16 and the actuator 14. The electric motor M and the valves $V_1$, $V_2$, $V_3$, $V_4$ and $V_5$ are controlled by an electronic control unit ECU to operate according to predetermined operating modes. To this end, the electronic control unit ECU is connected directly or indirectly to one or more sensors on board of the vehicle.

By virtue of such a configuration, the suspension is able to operate according to the operating modes illustrated below.

First of all, when the accumulator 16 is not charged enough, it can be charged before the vehicle is started, and hence before the suspension begins to operate. To this end, the valves $V_2$ and $V_3$ are opened to put the accumulator 16 into communication with the tank T through the third hydraulic line 24 and the pump P is driven to pump the working fluid from the tank T to the accumulator 16. Once the accumulator 16 has been charged, at least the valve $V_2$ is closed to keep the pressure level reached in the accumulator 16 unchanged. The use of a synchronous electric motor M, such as for example a brushless DC electric motor with speed-, phase- and current-control, to drive the pump P during the circuit pre-charging phase makes it possible for the motor to operate at low speed, and hence with a low noise level, and also allows to estimate the pre-charging pressure by measurement of the phase current. Thanks to the low noise level generated by the pump actuating system, the circuit may also be pre-charged when the engine is not running yet, for example as soon as the vehicle doors are opened, thus before the suspension begins to operate.

The suspension is able to lift the vehicle body with an infinite hydraulic stiffness. To this end, the actuator 14 is put into fluid communication with the accumulator 16 through the third hydraulic line 24, with the valves $V_2$ and $V_4$ in the open position. Part of the energy required to lift the vehicle by the actuator 14 is thus provided by the elastic energy stored in the accumulator 16, and therefore the energy that has to be provided by the motor M to drive the pump P is only the energy required to compensate for any losses. During the vehicle lifting phase, if the amount of working fluid stored in the accumulator 16 is not enough to allow to obtain the required lifting travel, the valve $V_2$ is closed while the valve $V_1$ is opened, so that the pump P is allowed to pump the working fluid from the tank T to the actuator 14 through the third hydraulic line 24. Should the actuator 14 stop while the pump P is still pumping the working fluid to the actuator to cause lifting of the vehicle, the excess working fluid supplied by the pump P would be conveyed to the tank T by opening of the valve $V_3$. Once the desired position has been reached, the valve $V_4$ is closed and therefore the actuator remains in the position reached with no need to supply the system with energy.

The suspension is also able to cause lowering of the vehicle body with infinite hydraulic stiffness. Also during this phase, as well as during the lifting phase, the actuator 14 is put into fluid communication with the accumulator 16 through the third hydraulic line 24, with the valves $V_2$ and $V_4$ in the open position. In this case, the potential energy released during the lowering phase is converted into elastic energy of the accumulator 16. Any possible surplus of energy, which is not recoverable in the accumulator 16, can be recovered by the electric motor M working as generator. If, during the lowering phase, the amount of working fluid which is pumped by the pump P from the actuator 14 to the accumulator 16 is not enough to ensure the required pre-charging of the accumulator, the suction port of the pump P may be switched to the tank T by closing the valve $V_4$ and opening the valve $V_3$. If, on the other hand, the pressure in the accumulator 16 reaches a limit value while the pump P is still pumping the working fluid to the accumulator, the excess working fluid supplied by the pump P is directed to the tank T by opening the valve $V_1$. Once the desired position has been reached, the valve $V_4$ is closed to keep the actuator 14 in that position and at the same time the valve $V_3$ is closed to keep the accumulator 16 pressurized with no need to supply the system with energy.

Using a brushless DC electric motor with speed- and phase-control as the electric motor M makes it possible to control the speed and the position of the actuator 14 both during the lifting phase and during the lowering phase, with no need for additional sensors.

In case the bypass line 26, with the associated bypass valve $V_5$, is also provided for, the suspension is also able to work according to the two further operating modes illustrated below to carry out a "bang-bang" adjustment or an adaptive adjustment of the stiffness.

With the bypass valve $V_5$ open, the actuator 14 is directly connected to the accumulator 16 through the bypass line 26. Accordingly, the overall stiffness k of the suspension, which is the sum of the reciprocal of the stiffness $k_1$ of the mechanical spring 10 and the reciprocal of the stiffness $k_2$ of the actuator 14, as already stated above, depends on the stiffness of the accumulator 16. If the bypass valve $V_5$ is closed and at least the valve $V_4$ is kept closed, the actuator 14 becomes infinitely stiffness and the overall stiffness k of the suspension reaches therefore its maximum value, equal to the stiffness $k_1$ of the mechanical spring 10. This operating mode allows therefore to obtain an increase in the overall stiffness of the suspension with a low energy consumption, as it only requires to activate or deactivate the bypass valve $V_5$. By suitably implementing this operating mode on the suspensions of all the four wheels of the vehicle it is possible to counter the roll and pitch motions of the vehicle, for example in case of braking or during path-change manoeuvres. On the other hand, by leaving the bypass valve $V_5$ open and opening also the valve $V_2$ to put the accumulator 16 into communication with the tank T through the third hydraulic line 24, and by suitably driving the pump P, it is possible to charge or discharge the accumulator 16 to change its stiffness and hence change the overall stiffness of the suspension. It is thus possible to carry out a slow adaptive control of the suspension stiffness.

Figure 4:
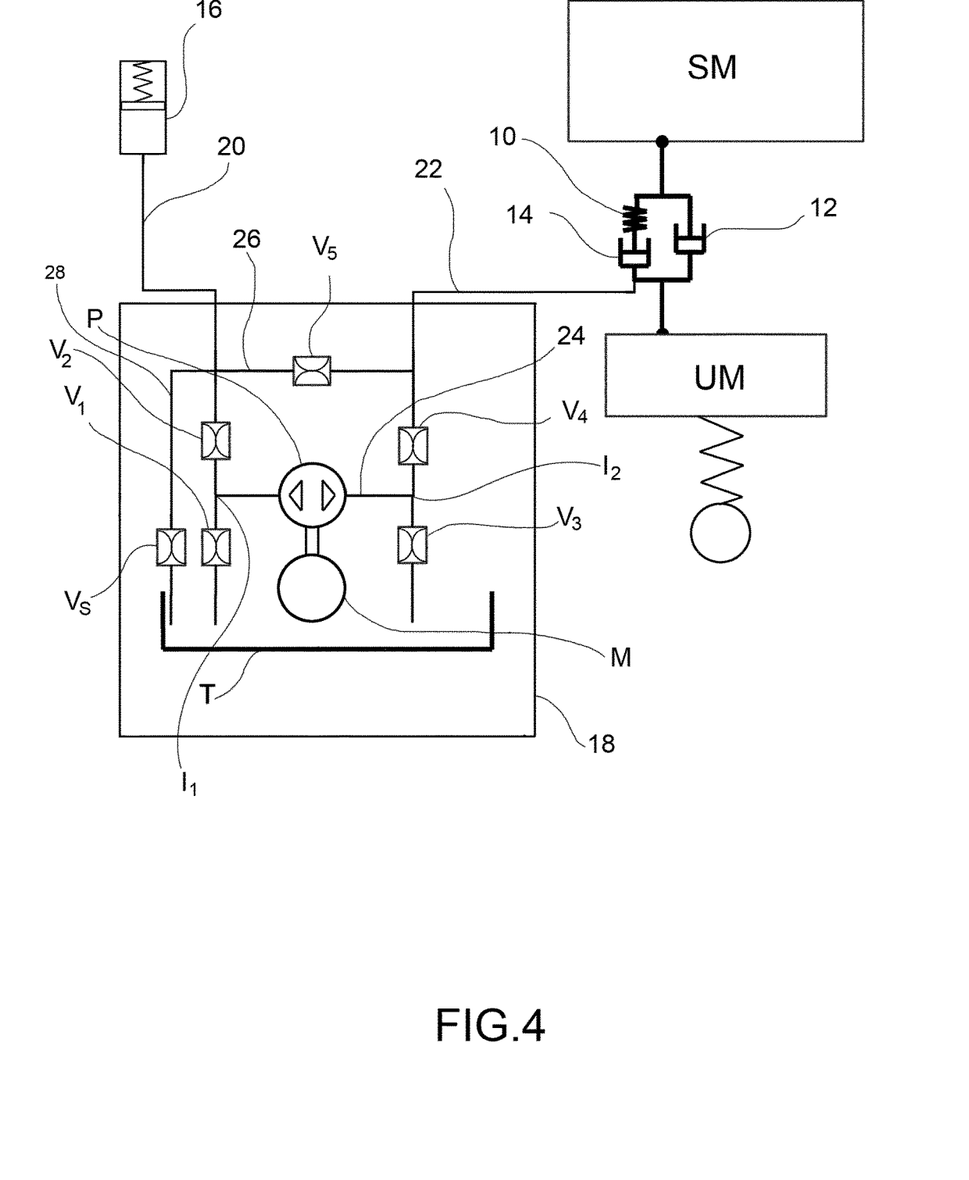
FIG. 4 schematically shows a variant embodiment of the hydro-mechanical suspension of FIG. 3.

According to the embodiment shown in FIG. 4, where parts and elements identical or corresponding to those of FIG. 3 are indicated by the same reference signs and where, for the sake of clarity, the electronic control unit ECU, with the relating connection to the electric motor and to the valves of the hydraulic circuit 18, is not shown, the hydraulic circuit 18 further comprises a fifth hydraulic line 28, or discharge line, which is derived from the first hydraulic line 20 to connect the accumulator 16 directly with the tank T. A relief valve $V_S$ is arranged along the discharge line 28, so that opening of this valve makes it possible to empty the accumulator 16.

Figure 5:
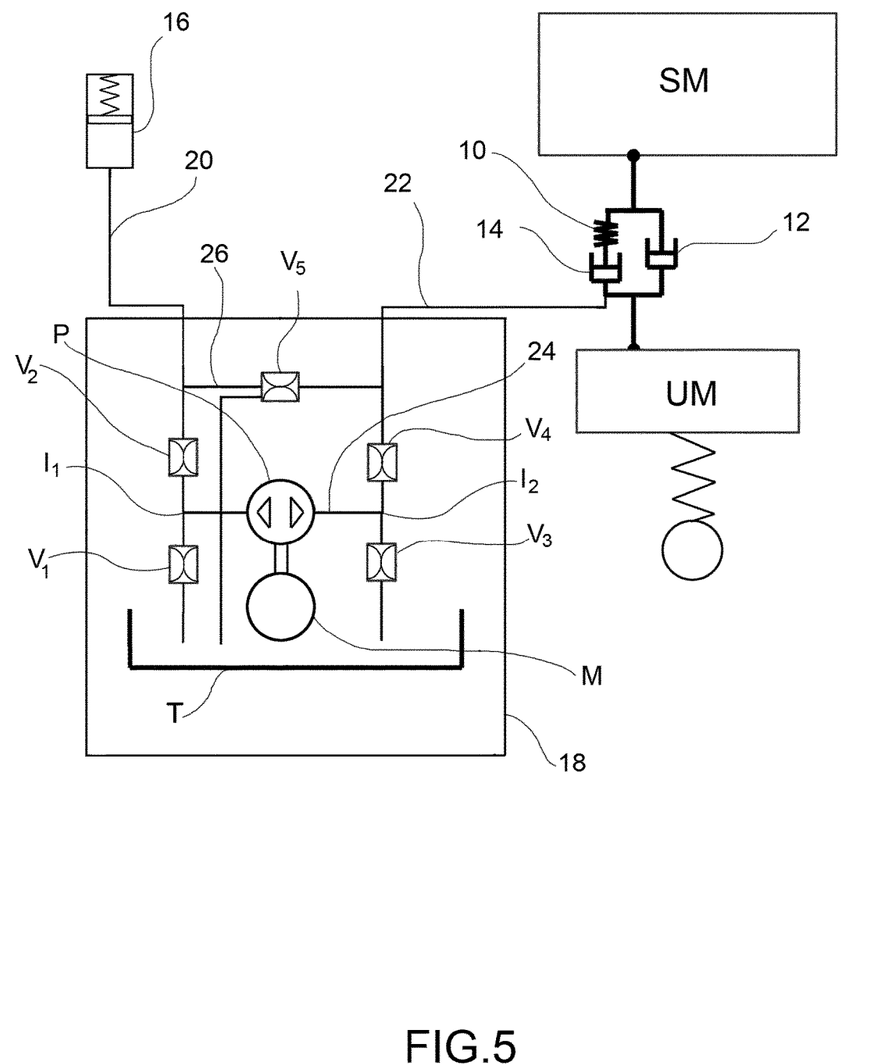
FIG. 5 schematically shows a further variant embodiment of the hydro-mechanical suspension of FIG. 3.

Finally, according to the embodiment of FIG. 5, where parts and elements identical or corresponding to those of FIG. 3 are indicated by the same reference signs and where, for the sake of clarity, the electronic control unit ECU, with the relating connections to the electric motor and to the valves of the hydraulic circuit 18, is not shown, the bypass valve $V_5$ is made as a proportional valve which is able to discharge the excess working fluid into the tank T to allow to adjust the pressure in the second hydraulic line 22, thereby continuously controlling the force applied by the actuator 14, or to allow to continuously control the position of the actuator 14.

As is clear from the above description, the hydro-mechanical suspension of the present invention allows to adjust, in a continuous or multistable manner, the stiffness of the suspension and the height of the vehicle from the ground with low energy consumption, thanks to the energy recovery capability.

Naturally, the principle of the invention remaining unchanged, the embodiments and the constructional details may vary widely from those described and illustrated purely by way of non-limiting example, without thereby departing from the scope of the invention as defined in the appended claims.

The invention claimed is:

1. A hydro-mechanical suspension for a vehicle, comprising a mechanical spring interposed between an unsprung mass (UM) of the vehicle and a sprung mass (SM) of the vehicle, a shock-absorber interposed between said unsprung mass (UM) and sprung mass (SM), in parallel with the mechanical spring, a hydraulic linear actuator arranged in series with the mechanical spring, an accumulator, a tank (T) containing an incompressible working fluid and a hydraulic circuit for hydraulically connecting with each other, according to predetermined operating modes, the hydraulic linear actuator, the accumulator and the tank (T), wherein the hydraulic circuit comprises
a first hydraulic line through which the accumulator is hydraulically connected with the tank (T),
a second hydraulic line through which the hydraulic linear actuator is hydraulically connected with the tank (T),
a third hydraulic line connecting the first and second hydraulic lines with each other,
a single pump (P), which is made as a reversible pump and is arranged along the third hydraulic line,
a reversible electric motor (M) coupled to the pump (P) to drive the pump (P) in either direction, and
a plurality of valves ($V_1$, $V_2$, $V_3$, $V_4$, $V_5$, $V_S$) arranged along the first and second hydraulic lines to control the flow of the working fluid between the accumulator, the tank (T) and the hydraulic linear actuator, said plurality of valves ($V_1$, $V_2$, $V_3$, $V_4$, $V_5$, $V_S$) including a first valve ($V_1$), a second valve ($V_2$), a third valve ($V_3$) and a fourth valve ($V_4$), wherein the first valve ($V_1$) and the second valve ($V_2$) are arranged along the first hydraulic line, on the same side as the tank (T) and on the same side as the accumulator, respectively, relative to a first point of intersection ($I_1$) between the first hydraulic line and the third hydraulic line, and wherein the third valve ($V_3$) and the fourth valve ($V_4$) are arranged along the second hydraulic line, on the same side as the tank (T) and on the same side as the hydraulic linear actuator, respectively, relative to a second point of intersection ($I_2$) between the second hydraulic line and the third hydraulic line.

2. The suspension of claim 1, wherein the hydraulic circuit further comprises a fourth hydraulic line connecting the first and second hydraulic lines with each other, in parallel with the third hydraulic line, and wherein said plurality of valves ($V_1$, $V_2$, $V_3$, $V_4$, $V_5$, $V_S$) further comprises a fifth valve ($V_5$) arranged along said fourth hydraulic line to control the direct flow of the working fluid between the accumulator and the hydraulic linear actuator.

3. The suspension of claim 2, wherein said fifth valve ($V_5$) is made as a proportional valve arranged to discharge excess working fluid into the tank (T) to allow to adjust the pressure in the second hydraulic line.

4. The suspension of claim 1, further comprising an electronic control unit (ECU) arranged to control the electric motor (M) and said plurality of valves ($V_1$, $V_2$, $V_3$, $V_4$, $V_5$, $V_S$), to implement predetermined operating modes.

5. The suspension of claim 1, wherein the electric motor (M) is a brushless DC electric motor with speed-, phase- and current-control.

6. The suspension of claim 1, wherein the hydraulic circuit further comprises a fifth hydraulic line which is derived from the first hydraulic line to connect directly the accumulator with the tank (T) and wherein said plurality of valves ($V_1$, $V_2$, $V_3$, $V_4$, $V_5$, $V_S$) further comprises a relief valve ($V_S$) arranged along said fifth hydraulic line to control the flow of the working fluid from the accumulator to the tank (T) through said fifth hydraulic line.

* * * * *

UNITED STATES PATENT AND TRADEMARK OFFICE
CERTIFICATE OF CORRECTION

PATENT NO. : 10,160,282 B2
APPLICATION NO. : 15/552861
DATED : December 25, 2018
INVENTOR(S) : Massimo Seminara Page 1 of 1

It is certified that error appears in the above-identified patent and that said Letters Patent is hereby corrected as shown below:

On the Title Page

Item (30) Foreign Application Priority Data: delete "Oct. 26, 2015" and insert therefor --Feb. 26, 2015--.

Signed and Sealed this
Fifth Day of March, 2019

Andrei Iancu
*Director of the United States Patent and Trademark Office*